E. G. HARROP.
EXPANSIBLE FLEXIBLE BRACELET.
APPLICATION FILED JULY 29, 1907.

998,173.

Patented July 18, 1911.

Witnesses.

Inventor.

UNITED STATES PATENT OFFICE.

EDWIN GEORGE HARROP, OF CLERKENWELL, LONDON, ENGLAND.

EXPANSIBLE FLEXIBLE BRACELET.

998,173.

Specification of Letters Patent. Patented July 18, 1911.

Application filed July 29, 1907. Serial No. 386,096.

*To all whom it may concern:*

Be it known that I, EDWIN GEORGE HARROP, a subject of the King of England, residing at Clerkenwell, London, England, have invented new and useful Improvements in Expansible Flexible Bracelets, of which the following is a specification.

My invention relates to an expansible flexible bracelet composed of a plurality of links of uniform size and the object is to provide an article of this kind that shall be reliable of action, symmetric in appearance at all stages of expansion and cheaply manufactured; the chief feature residing in the construction of a hollow middle link in a single piece having a comparatively narrow longitudinal slot and two imprisoned helical springs.

According to the improved construction I advantageously use hollow slotted links of identical form and shape throughout, and they may be cylindrical with spherical ends or flat with rounded ends, while, moreover, they may be straight, curved or oval, plain or ornamented.

In order that my invention may be clearly understood and readily carried into effect I will now proceed to describe the same fully with reference to the accompanying drawings, in which:—

Figure 1:
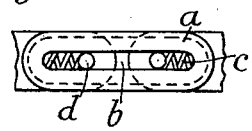
Figure 2:
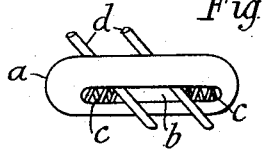
Figure 3:
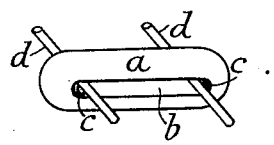
Figure 4:
Figure 5:
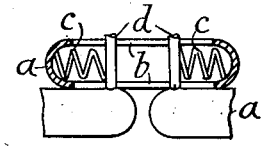
Figure 6:
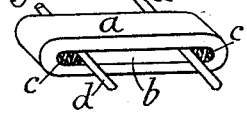
Figure 7:
Figure 8:
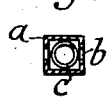
Figure 9:
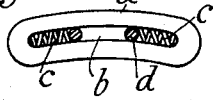
Figure 10:
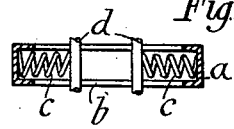
Figure 11:
Figure 12:
Figure 13:
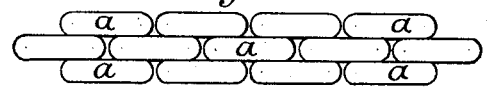

Figure 1 is a side-view of a slotted cylindrical middle link fitted with its two springs and showing the cross-pins and portions of the co-acting links at one side thereof; Figs. 2 and 3 are perspective views of the middle link separately with the cross-pins in position for expanded and compressed springs respectively; Figs. 4 and 5 are a cross section and a longitudinal section respectively through the slot of the said link; Fig. 6 is a perspective view of a hollow slotted flat-shaped link with rounded ends; Fig. 7 is a cross section of Fig. 6 and Fig. 8 shows a similar section with a spring inserted therein; Figs. 9 and 10 are a side elevation and a horizontal section respectively of a hollow curved link with the springs shown in position. All these figures are shown to an enlarged scale. Figs. 11, 12 and 13 show to a smaller scale a series of such hollow slotted links joined together in the manner they appear on a bracelet before and after expanding.

The same letters of reference denote the same or similar parts throughout the various figures.

The hollow links $a$ may be produced in a well known manner by drawing the metal through a draw-plate and then winding it in close spirals over an appropriate mandrel to suit the length of the links. The spirals are cut apart and soldered at the juncture, the slots $b$ being formed by the mandrel.

Suitable helical springs $c$ of the required length are introduced in the links, which serve as middle links, while the outer links have a cross-pin $d$ fixed near each end, such pins passing through the slot $b$ of the middle link and forming a rigid connection for each pair of outer or twin links. The helical springs $c$ practically fit the interior of the hollow links and are consequently larger than the slots $b$ of said links, but they can be easily introduced by gradually screwing or twisting the same through the slot into the interior space or width of the link. This manner of manufacture prevents the springs being damaged by the heat applied for soldering the ends of the links.

The pins $d$ having been secured in one of the outer or twin links are passed through the slot of the middle link so as to imprison the springs against the ends thereof and are then fixed in the opposite outer link. Thus, the springs are not fastened and yet cannot fall out or become disengaged or displaced. Furthermore, by making all the links of single parts and uniform shape without projecting corners or edges, their manufacture is cheapened, of more pleasing appearance, and distortion of the links or their catching in articles of dress is avoided.

I claim:—

1. An expanding flexible chain construction, comprising a series of middle links constructed with spring housings and having relatively narrow, longitudinal side slots, side links arranged on either side of the middle links, pins connected to said side links and joining them together in pairs, said pins being constructed to pass endwise through the spring housings in assembling, and being rotatable in said slots to permit flexibility of the chain in the direction transverse to the plane of the links, and springs located between the inner ends of said spring housings and said pins.

2. An expanding flexible chain-bracelet or the like, comprising a series of hollow middle links, constructed with spring housings and narrow side slots, side links arranged on either side of the middle links, pins constructed to pass endwise through said side slots, and to rotate therein and permit transverse flexibility in assembling the parts, and having their ends rigidly connected to said side links and joining them together in pairs and springs substantially fitting the spring housings, confined by the side walls thereof and located between the inner ends of said housings and the pins.

EDWIN GEORGE HARROP.

Witnesses:
J. CHATWIN,
H. D. JAMESON.